United States Patent [19]

Ragan

[11] 4,285,136
[45] Aug. 25, 1981

[54] WHEEL CLAMP

[75] Inventor: Marshall P. Ragan, Mayflower, Ark.

[73] Assignee: FMC Corporation, San Jose, Calif.

[21] Appl. No.: 112,764

[22] Filed: Jan. 17, 1980

[51] Int. Cl.³ .................... G01B 5/255; G01B 11/275
[52] U.S. Cl. .................................. 33/203.18; 33/288;
                                              33/336; 248/205 R
[58] Field of Search ..................... 33/203, 203.18, 336,
         33/337, 288, 203.19, 203.2, 203.21; 356/155;
                              248/205 R, 255.4, DIG. 4

[56] References Cited

U.S. PATENT DOCUMENTS

| 2,475,502 | 7/1949 | Holmes . | |
| 2,927,758 | 3/1960 | MacMillan | 248/205 R |
| 3,488,857 | 1/1970 | Bateman | 33/203.18 |
| 3,709,451 | 1/1973 | Graham . | |
| 4,151,655 | 5/1979 | Makarainen | 33/203.18 |
| 4,167,817 | 9/1979 | Hunter | 33/203.18 |

FOREIGN PATENT DOCUMENTS 164767 8/1955 Australia ............................... 33/203.18

Primary Examiner—William D. Martin, Jr.
Attorney, Agent, or Firm—R. S. Kelly

[57] ABSTRACT

A wheel clamp for mounting a wheel aligning tool on a wheel rim and in a plane parallel to that of the wheel rim is disclosed. A lower bracket, a center sliding bracket and an upper clamping bracket are all mounted on a pair of parallel rods. The lower bracket is fixed to one end of the parallel rods, and two rim-engaging fingers project rearward therefrom. The upper clamping bracket slides freely on the parallel rods, and a single rim-engaging finger projects rearward therefrom. The upper sliding bracket may be positioned on the parallel rods so that the three rim-engaging fingers bear against either the inside surface or the outside surface of a peripheral lip found on the wheel rim. A clamping mechanism mounted on the upper clamping bracket fixes the upper bracket to the parallel rods and stresses the three-rim engaging fingers against either the outside or the inside surface of the peripheral lip, depending on which direction a knob on the clamping mechanism is turned. Alternative mounting means are provided on the center sliding bracket which allow the wheel clamp to be mounted directly on the lug bolts of a vehicle wheel.

12 Claims, 8 Drawing Figures

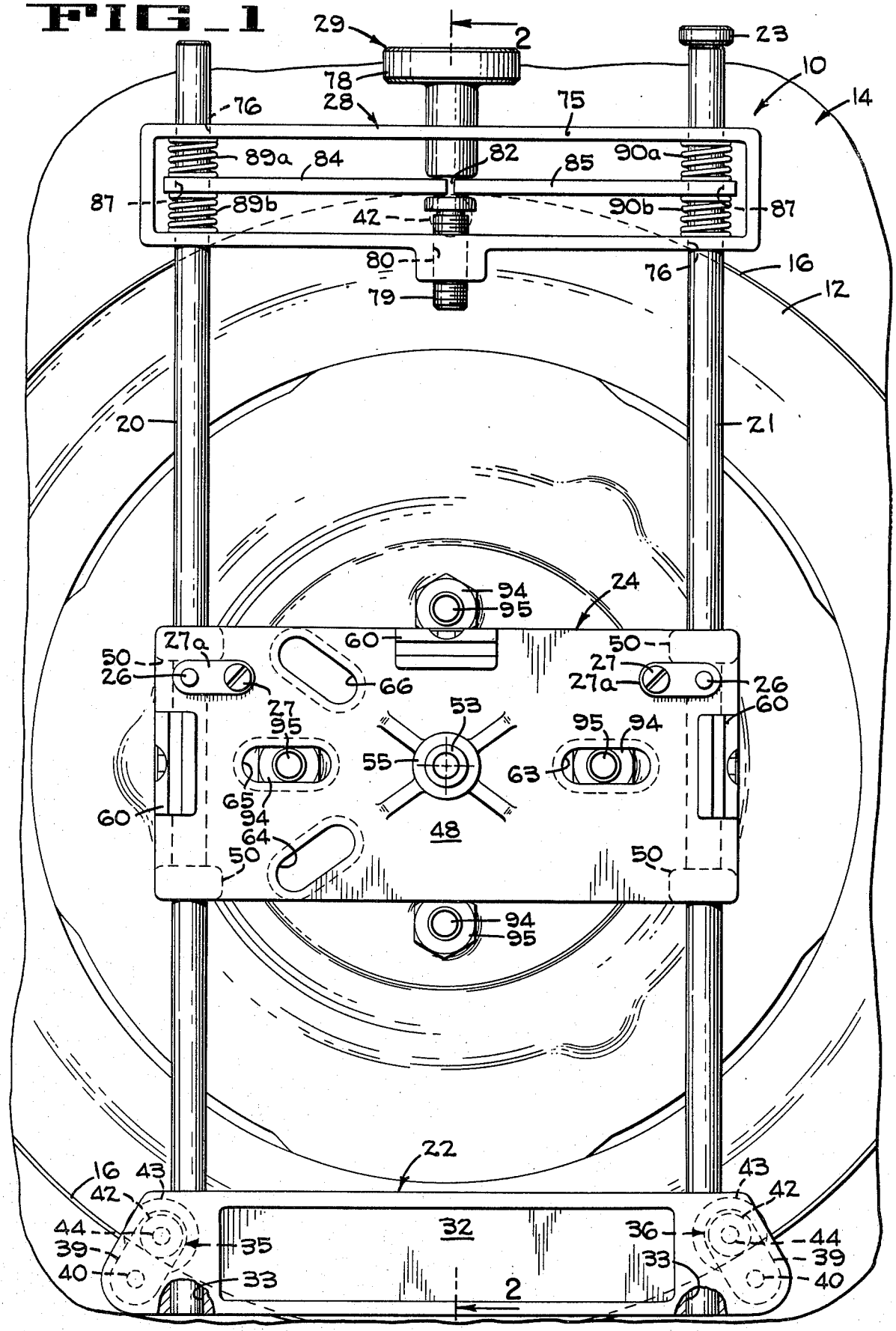

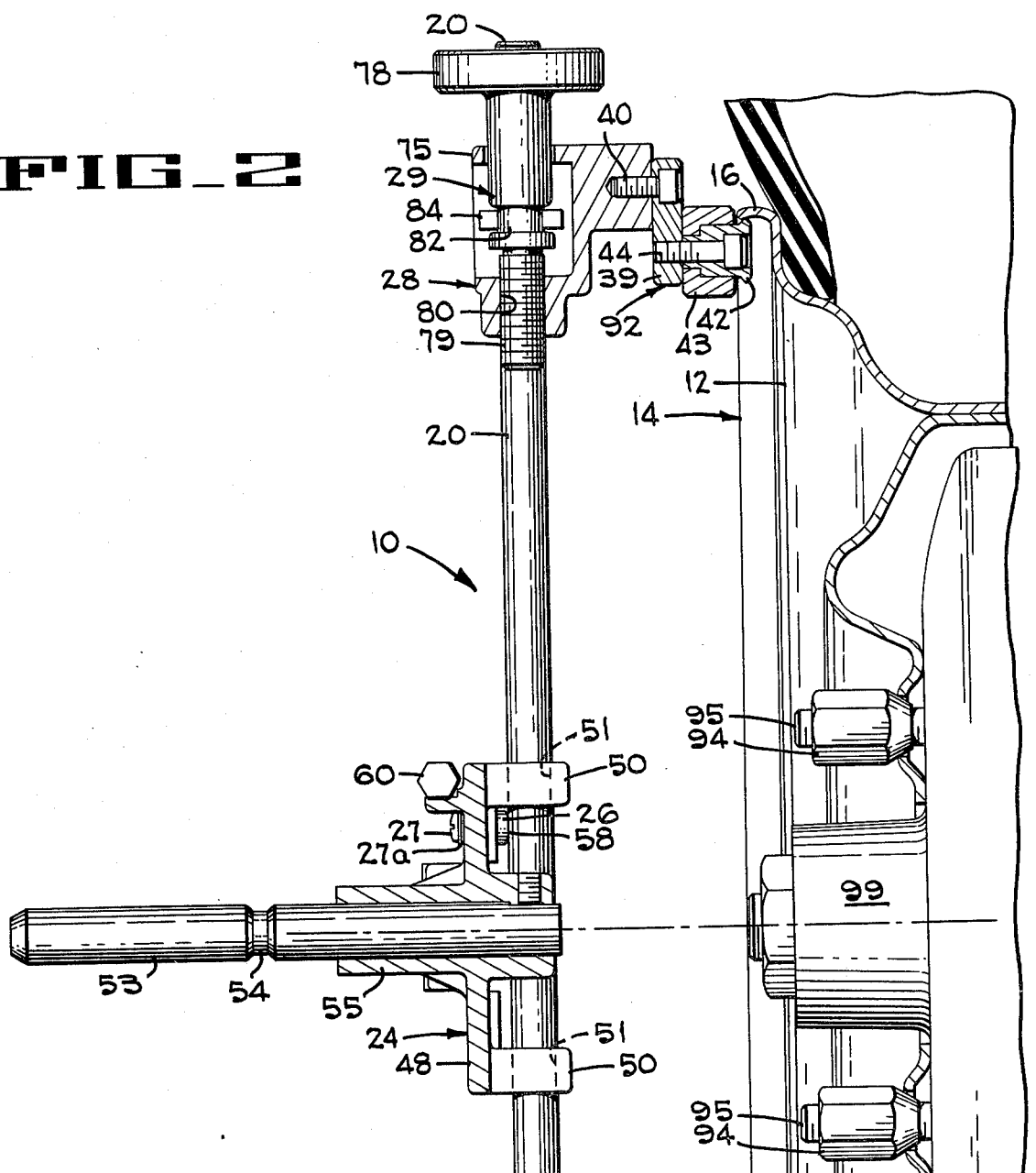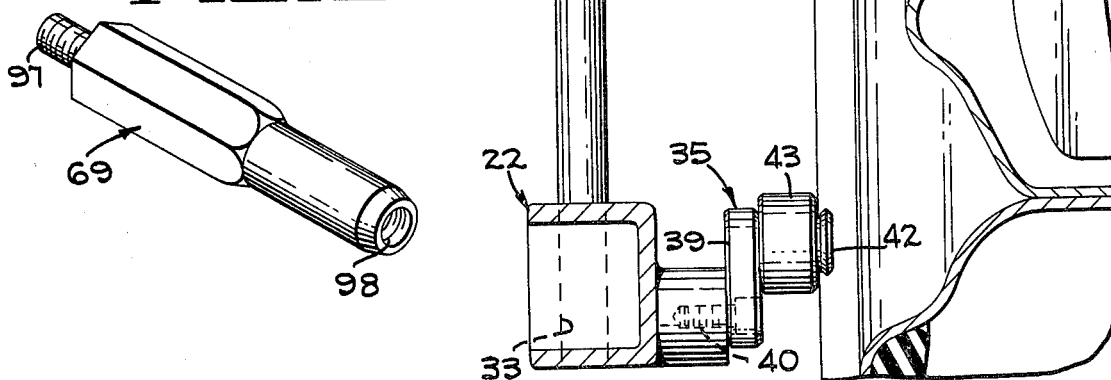

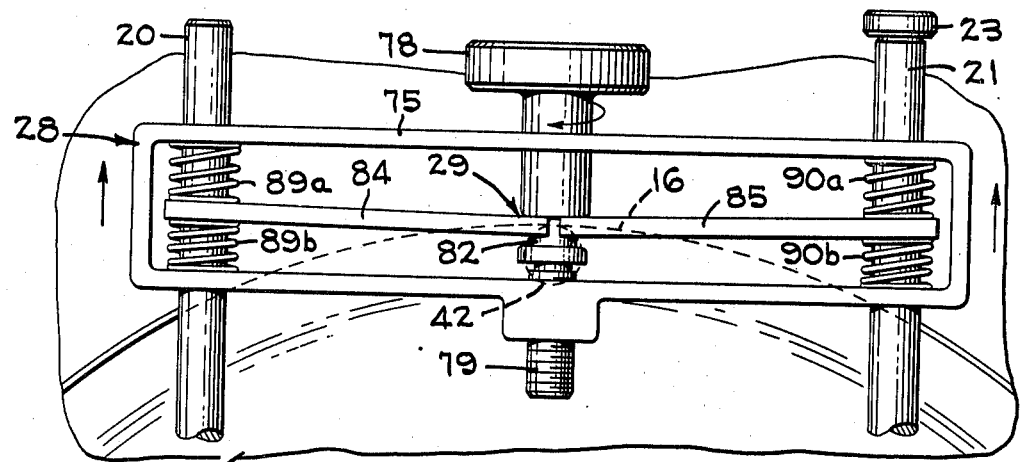
FIG_3
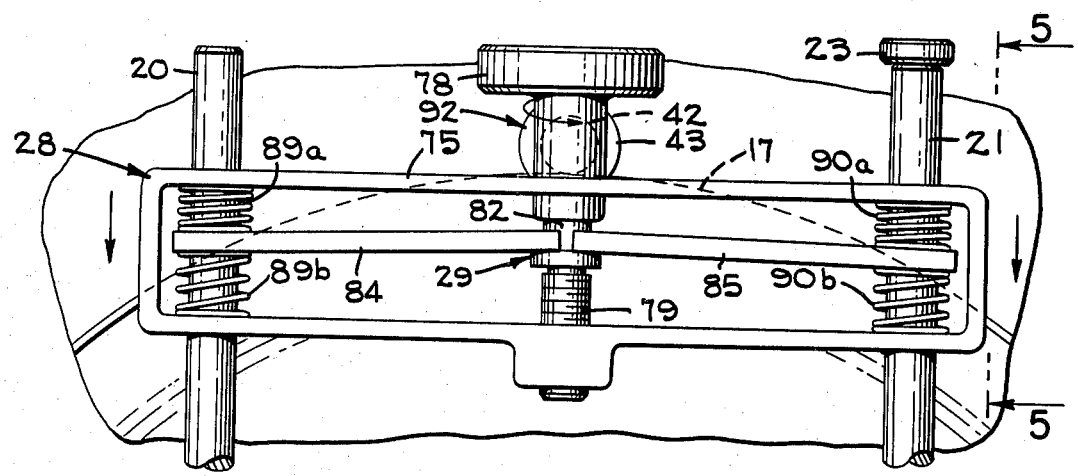
FIG_4
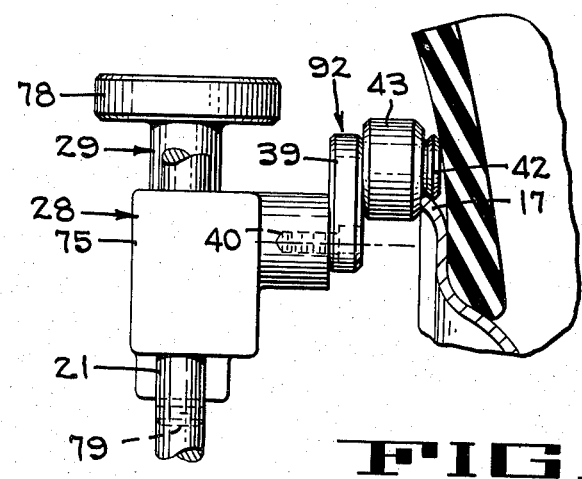
FIG_5

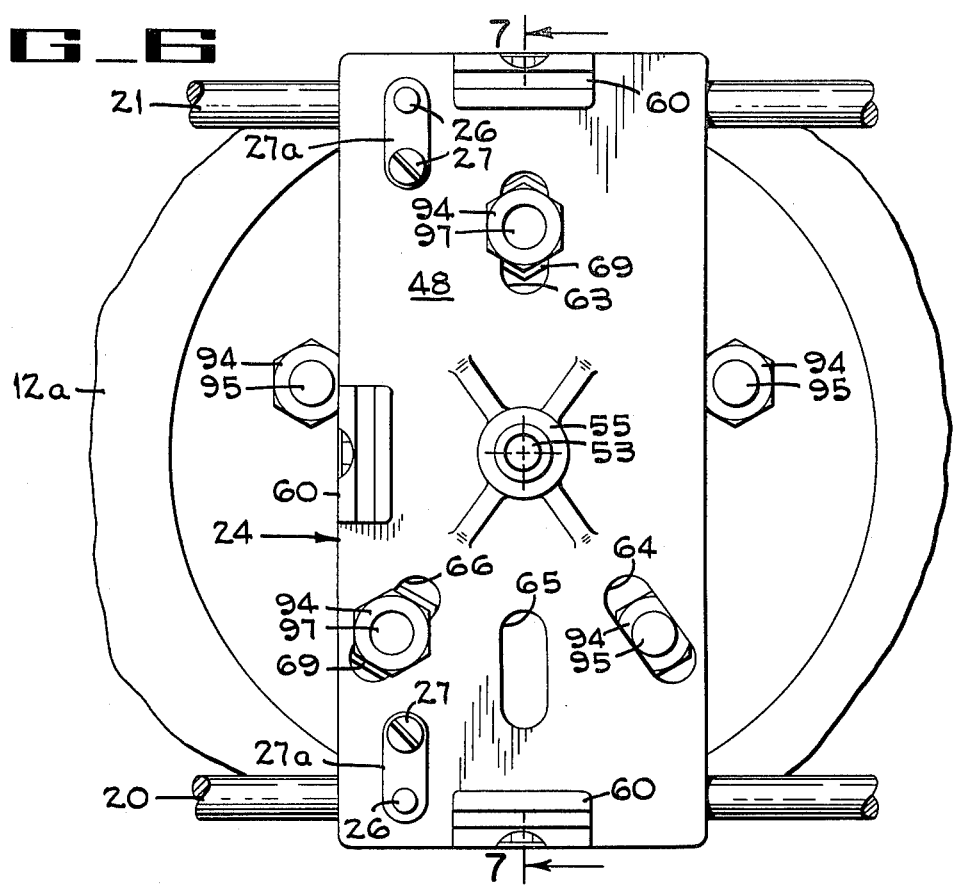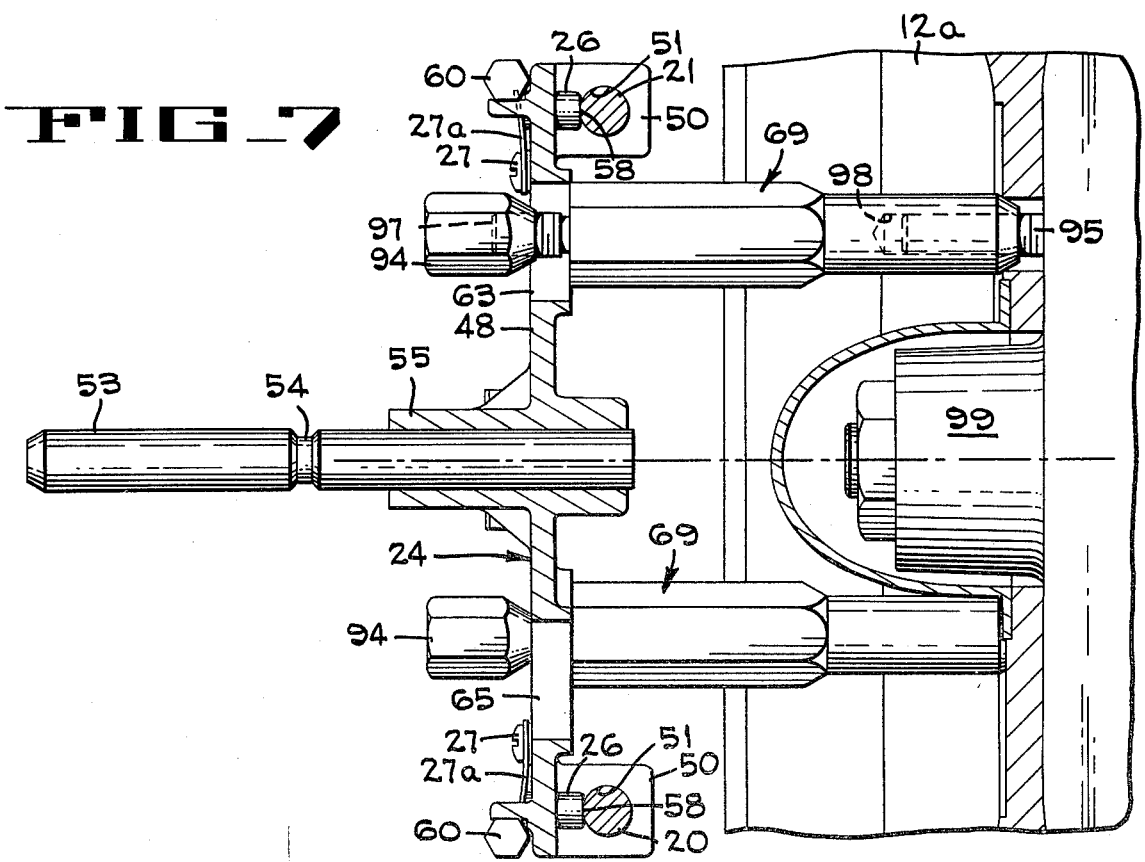

WHEEL CLAMP

BACKGROUND OF THE INVENTION

1. Field of the Invention

This invention relates to the wheel alignment art and more particularly relates to a wheel clamp which engages a wheel rim to accurately support a wheel aligning tool in a plane parallel to the plane of the wheel rim.

2. Description of the Prior Art

Wheel clamps of varying design have long been used to support a wheel aligning device in a plane parallel to the plane of the wheel rim. Typically, a clamp will have three rim-engaging teeth adapted to grasp a peripheral lip extending around the wheel rim and projecting outward therefrom. When the peripheral lip projects perpendicularly from the wheel rim, as shown at 16 in FIG. 2 of the Drawings, the rim-engaging teeth most often engage the inside surface of the peripheral lip. When the peripheral lip lies at an angle directed away from the wheel axis, as shown at 17 in FIG. 5 of the Drawings, it is necessary to engage the outside surface of the peripheral lip. Thus a wheel clamp must have the capability of pressing the rim-engaging teeth outwardly to engage the inner surface of the peripheral lip or pressing them inwardly to engage the outer surface of the peripheral lip. Such a wheel clamp is disclosed in the U.S. patent to Holmes U.S. Pat. No. 2,475,502, issued on July 5, 1949.

A conventional wheel clamp requires the presence of some sort of peripheral lip on the wheel rim for the clamp to engage. In recent years, however, many new wheel styles have been introduced which do not include any outwardly projecting lip along the periphery of the wheel rim. Also, many decorative wheel rims which do display a peripheral lip would be marred by a conventional wheel clamp which bites into the wheel rim. Service personnel attempting to use conventional wheel clamps in such situations often find that they are either unable to mount the clamp, or that the clamp falls off once the wheel is rotated for the requisite testing. Such disengagement not only damages the wheel clamp, but also presents a danger to personnel working nearby.

SUMMARY OF THE INVENTION

It therefore is an object of the present invention to provide a wheel clamp for supporting a wheel alignment tool in a plane parallel to the plane of a wheel rim which is further capable of clamping to virtually all types of wheel rims found on automobiles and light trucks.

It is a further object of the present invention to provide a wheel clamp capable of attaching to wheel rims which do not have peripheral lips.

It is a further object of the present invention to provide a wheel clamp capable of conveniently grasping either the inside or the outside of the peripheral lip of a wheel rim.

It is a final object of the present invention to provide a wheel clamp capable of attaching to a wheel rim without marking or marring said wheel rim in any way.

The above objects are met by providing a wheel clamp capable of grasping either the inside surface or the outside surface of the peripheral lip found on a wheel rim or, in the alternative, capable of affixing directly to the vehicle wheel in place of a pair of lug nuts.

The wheel clamp comprises a frame carrying a lower bracket, a center sliding bracket, and an upper clamping bracket. Both the center sliding bracket and the upper clamping bracket are slidably mounted on the frame, while the lower bracket is affixed thereto. Means are provided on both the upper and lower brackets to engage a peripheral lip found on most common wheel rims. In the preferred embodiment, a pair of rim-engaging fingers project rearward from the lower bracket and a single rim-engaging finger projects rearward from the upper bracket. The three rim-engaging fingers lie in a triangular pattern such that by adjusting the position of the upper clamping bracket on the frame, the fingers may be selectively engaged against either the inside surface or the outside surface of the peripheral lip found on the wheel rim.

Means are provided on the upper bracket for selectively urging said bracket toward or away from the lower bracket in order to provide the selective engagement of the fingers. This means comprises a mechanism which is actuated by shifting a clamping member relative to the upper bracket into engagement with spring-loaded latch members to lock the latch members to the frame, the direction of shifting of the clamping member determining whether the fingers are forced outwardly or inwardly to grip the wheel rim. The rim-engaging finger of the upper bracket may thus be stressed upwards or downwards depending on the direction that the clamping member is moved.

According to another aspect of the present invention, the wheel clamp may also be mounted directly on the vehicle wheel in place of either the lug nuts, or the lug bolts, depending on the construction of the wheel. Spacers with one end adapted to directly engage the vehicle wheel and the other end adapted to be received by the center bracket are used to attach the clamp directly to the vehicle wheel.

BRIEF DESCRIPTION OF THE DRAWINGS

FIG. 1 is a front elevation illustrating the wheel clamp of the present invention mounted on a wheel rim.

FIG. 2 is a central, vertical section taken along lines 2—2 of FIG. 1.

FIG. 3 is a fragmentary elevation showing the upper clamping mechanism mounted on the inside of the wheel rim.

FIG. 4 is a view similar to FIG. 3, but showing the upper clamping mechanism mounted on the outside of the wheel rim.

FIG. 5 is an end elevation taken in the direction of lines 5—5 of FIG. 4.

FIG. 6 is a front elevation illustrating a portion of the wheel clamp being mounted on a wheel rim by means of spacers.

FIG. 7 is a central vertical section taken along lines 7—7 of FIG. 6.

FIG. 8 is an isometric view of a spacer.

DESCRIPTION OF THE PREFERRED EMBODIMENT

The wheel clamp 10 (FIGS. 1 and 2) of the present invention is clamped onto the wheel rim 12 of a wheel rim and tire assembly 14 and serves to support a wheel aligning tool (not shown) such as a mirror in a plane that is parallel to the plane of the wheel rim 12. The wheel clamp 10 is designed for use with automobile wheels and light truck wheels. Ordinarily, the wheel rims of such wheels terminate at their outer edge with a short peripheral lip such as that shown at 16 (FIG. 2). The precise design of this peripheral lip varies from wheel to wheel and may resemble that shown at 17 in FIG. 5. Finally, many modern decorative wheel rims display no peripheral lip at all along their terminal edge. The wheel clamp 10 of the present invention is adapted for use with any type of wheel rim.

The wheel clamp 10 includes a frame comprising a first parallel rod 20 and a second parallel rod 21 mounted in a lower bracket 22. Mounted on the frame are a center sliding bracket 24 and an upper clamping bracket 28, both slidably received on the parallel rods 20 and 21 and described in detail hereinafter.

The lower bracket 22 comprises a cast body 32 having holes 33 in either end, said holes being adapted to fixedly receive the corresponding parallel rods 20 or 21. A first rim-engaging finger 35 (FIGS. 1 and 2) and a second rim-engaging finger 36 (FIG. 1) are pivotally attached to the lower bracket 22 and project rearward therefrom. Rear is defined as the side of the wheel clamp adjacent to the wheel rim 12. As shown in FIG. 2, each rim-engaging finger comprises a pivot arm 39 free to rotate about an attachment screw 40 which holds the arm to the lower bracket. A generally cylindrical tooth 42 with a sharp circumferential projecting edge is received within a cylindrical cavity formed in an abutting member 43, and both the tooth and the abutting member are attached to the free end of the pivot arm 39 by a screw 44. This manner of attachment allows the rim-engaging finger to rotate freely about a horizontal axis formed through the attachment screw 40. The details of such construction for a rim-engaging finger have been illustrated in FIG. 2 in connection with an upper rim-engaging finger 92 only, but they apply equally well to the rim-engaging fingers 35 and 36 mounted on the lower bracket 22.

As shown in FIG. 1, the parallel rods 20 and 21 project upward from the lower bracket 22, and the second rod 21 terminates with an enlarged end cap 23 which prevents both the center sliding bracket 24 and upper clamping bracket 28 from sliding off the frame during normal operation. The end cap 23 is removable so that the brackets 24 and 28 may be taken off the frame when desired.

The center sliding bracket 24 (FIGS. 1 and 2) has a cast body 48 including four slide bearings 50 projecting from the rear and having holes 51 (FIG. 7) therethrough. The parallel rods 20 and 21 are slidably received in the slide bearings. A cylindrical support spindle 53 having an annular depression 54 about its midsection projects forward from the center of the sliding bracket 24 and is mounted in a central socket 55 formed in the cast body 48 of the bracket.

Two friction buttons 26 (FIGS. 1 and 7) are received through holes in the cast body 48 of the center bracket 24. Each friction button is attached to the face of the bracket by an adjustment screw 27 and a leaf spring 27a which extends between the screw and the friction button. A flat surface 58 on the projecting end of each friction button 26 engages the associated parallel rod (20 or 21, FIG. 2) and the resulting friction restricts the free sliding movement of the center bracket 24 on the parallel rods 20 and 21. Adjustment of the screws 27 varies the force required to move the center bracket 24 along the parallel rods 20 and 21. Proper adjustment allows the center bracket to be manually aligned with the axis of the wheel while providing sufficient friction to hold the center bracket in place while the wheel is revolved.

Three level glasses 60 are provided on the front face of the center sliding bracket 24 at 90° angularly spaced positions. These levels are used in calibrating (measuring runout errors in) the wheel aligning device (not shown) mounted on the support spindle 53 in a well known manner which will not be described herein.

The cast body 48 of the center sliding bracket has four elongate slots 63, 64, 65 and 66 therethrough disposed at equal radial distances about the support spindle 53. The slots are one-half inch wide with a total length of 1¼ inches terminating in semicircles of ¼ inch radius at each end. The first slot 63 lies along the longitudinal axis of the center bracket 24. The first slot begins approximately 1¾ inches from the center of the bracket 24 and terminates approximately three (3) inches from the center of the bracket. The second slot 64 lies with its longitudinal axis on a line drawn from the center of the bracket 24 lying 36° below the longitudinal axis of the bracket and on the left hand side thereof (as seen in FIG. 1). The dimensions of the slot and the distance from the center are the same as for the first slot. The third slot 65 lies along the longitudinal axis of the center bracket in a position symmetric with that of the first slot 63. The fourth slot 66 is positioned symmetrically with the second slot 64, lying in the upper half of the center bracket 24. Each of these slots 63, 64, 65 and 66 is adapted to receive either end of a spacer bar 69 (FIG. 8). Two or more spacer bars may be used to connect the wheel clamp 10 directly to the wheel by engaging the spacer bars in place of the lug bolts (or lug nuts) and mounting the wheel clamp on the spacer bars. This manner of attachment will be discussed in greater detail hereinafter.

The upper clamping bracket 28 consists of a cast body 75 having pairs of vertically aligned holes 76 at each end adapted to receive the parallel rods 20 and 21 (FIG. 1). The holes 76 are of sufficient size to enable the upper bracket 28 to slide freely along the parallel rods 20 and 21. A clamping mechanism 29 is mounted on the upper bracket 28 and includes a clamping knob 78 received in the center of the upper bracket. The clamping knob includes a depending shaft which has an annular depression about its midsection 82 and a threaded lower end 79 which engages a threaded hole 80 formed in the lower half of the cast body 75. Clockwise rotation causes the knob 78 to move downward with respect to the cast body 75, and counterclockwise rotation causes the knob 78 to move upward with respect to the cast body 75. A first latch member 84, having a circular hole 87 on one side thereof and a semi-circular depression (not shown) on the other end thereof, extends from the first parallel rod 20 to the depending shaft of the clamping knob 78. The semi-circular depression is received in the annular depression 82 of the shaft. The circular hole 87 is adapted to receive the first parallel rod 20 and has a diameter slightly larger than the diameter of the parallel rod 20 so that the latch is free to slide upon the rod so long as the latch is maintained perpendicular to the rod. Similarly, a second latch member 85 extends between the second parallel rod 21 and the shaft of the clamping knob 78. The construction of the second latch member 85 is identical to that of the first latch member 84 and will not be described in detail. The second latch member is disposed between the annular depression 82 on the shaft of the clamping knob 78 and the second parallel rod 21 so that it lies symmetric to the first latch member 84 about the clamping knob 78.

Two springs 89a and 89b lie within one end of the upper clamping bracket 28 and are disposed about the first parallel rod 20. The spring 89a lies above the first latch member 84 and the spring 89b lies below the first latch member. The springs 89a and 89b cooperatively support the outer edge of the first latch member 84 within the cast body 75 in an attitude generally perpendicular to the first parallel rod 20. A similar pair of springs 90a and 90b supports the second latch member 85 in like manner.

The upper clamping bracket 28 and the clamping mechanism 29 are shown in a "relaxed" configuration in FIG. 1; that is, none of the springs 89a, 89b, 90a, 90b is under tension. The clamping knob 78 is positioned so that both latch members 84 and 85 are maintained perpendicular to the associated parallel rod (20 or 21) by the associated springs. The upper bracket 28 is thus free to move along the parallel rods since the holes 87 at the ends of each latch member 84 and 85 have diameters larger than that of the associated parallel rod. Rotation of the clamping knob 78 in either direction locks the upper clamping bracket 28 to the parallel rods 20 and 21 and thereby fixes the wheel clamp 10 to the wheel rim 12, as will be described hereinafter.

The upper rim-engaging finger 92 is pivotally attached to the rear of the upper clamping bracket 28 as shown in FIGS. 2 and 5. The construction of the rim-engaging finger 92 is identical to that of the fingers 35 and 36 described hereinbefore. The rim-engaging finger 92 is free to rotate about a horizontal axis, and said assembly will assume a different position when grasping the inner surface of the peripheral flange 16 (as shown in FIG. 2) from the position it assumes when grasping the outer surface of the peripheral flange 17 (as shown in FIG. 5).

The wheel clamp 10 is intended to temporarily support a wheel aligning device on a wheel rim while checking the alignment characteristics of the wheel. Such a wheel aligning device and the manner in which it is employed are described in the U.S. patent to Roberts et al U.S. Pat. No. 4,154,531. For such a wheel aligning device to accurately perform its function, the plane of the measuring instrument must be maintained parallel to the plane of the wheel rim and tire assembly 14 being examined. To achieve this parallel relationship, it is necessary to mount the wheel clamp 10 so that the spindle 53 is perpendicular to the plane of the wheel rim 12 and approximately aligned with the axis of the wheel 14. Using the present invention, such perpendicular mounting may be achieved in any one of three ways.

First, the wheel clamp 10 may be mounted so that the rim-engaging fingers 35, 36 and 92 contact the inner surface of the peripheral lip 16 of the wheel rim as shown in FIGS. 1 and 2. The user places the lower bracket 22 so that the teeth 42 on the rim-engaging fingers 35 and 36 engage the inner surface of the peripheral lip 16 and so that the abutting members 43 abut the leading edge of the peripheral lip 16, as shown in FIG. 2. With the lower bracket 22 of the wheel clamp 10 resting on the wheel rim as just described, the position of the upper sliding clamp 28 is adjusted to allow the tooth 42 on the upper rim-engaging member 92 to engage the inner surface of the peripheral lip 16. As the clamp 10 is so mounted, the rim-engaging fingers 35, 36 and 92 are oriented toward the center of the wheel rim. The wheel clamp 10 is then in the configuration shown in FIG. 1 with the upper sliding clamp 28 "relaxed" and capable of sliding downward on the parallel bars.

To firmly attach the wheel clamp 10 to the wheel rim 12, the clamp knob 78 is rotated in a clockwise direction as shown in FIG. 3. Such rotation moves the clamping knob 78 and its depending shaft downward, thus forcing the inner ends of the latch members 84 and 85 downward, and thereby cocking both latch members relative to the parallel rods 20 and 21. The holes 87 in the latch members through which the parallel rods 20 and 21 extend are sized to be just large enough so that when the latch members 84 and 85 are cocked, they bind against each of the parallel rods. Movement of the latch members 84 and 85 along the rods is thereby prevented. Further rotation of the clamp knob 78 in a clockwise direction causes the upper bracket to move upward relative to both the latch members 84 and 85 and the parallel rods 20 and 21. This upward motion, in turn, forces the upper and lower rim-engaging fingers 35, 36 and 92 to bite into the relatively soft inner surface of the peripheral lip 16, resulting in a firm attachment. The clamping knob 78 may be rotated through any angle (limited only by the length of thread thereon) to provide the necessary amount of clamping friction without overtightening and damaging either the peripheral lip 16 or the wheel clamp itself.

When the inner surface of the peripheral lip is inadequate to engage the attachment fingers, such as the peripheral lip shown in FIG. 5 at 17, the wheel clamp 10 may often be mounted on the outer surface of the peripheral lip. To accomplish this, the user places the wheel clamp next to the wheel rim 12 so that the lower rim-engaging fingers 34 and 35 engage the outer surface of the peripheral lip 17 at the bottom of the wheel rim 12. With the clamping mechanism 29 in its "relaxed" configuration, the upper clamp bracket 28 is moved upward until the upper rim-engaging finger 92 meets the outer surface of the peripheral lip 17 on the upper portion of the wheel rim 12. The upper clamp bracket is then moved downward until all three engagement fingers are oriented away from the center of the wheel (as shown for finger 92 in FIG. 5).

With the wheel clamp 10 thus in position, the user rotates the clamping knob 78 in a counterclockwise direction. This accomplishes two objects. First, as shown in FIG. 4, each latch member 84 and 85 is displaced upward from its relaxed position and canted against the associated parallel rod 20 or 21. This canting fixes both latch members relative to the parallel rods and the lower bracket 22, the latter being already engaged against the outer surface of the peripheral lip 17. Additional counterclockwise rotation of the clamping knob 78 displaces the cast body 75 of the upper bracket 28 downward relative to the latch members and the lower bracket. This tightens all three rim-engaging fingers 35, 36 and 92 against the outer surface of the peripheral lip 17 causing the teeth 42 to bite into the relatively soft metal of which the lip is composed and thus providing a firm attachment.

Once the wheel clamp 10 is mounted by either of the methods described hereinabove, it is necessary for the user to align the sliding center bracket 24 with the center of the wheel rim 12. This is accomplished by manually moving the bracket 24 along the parallel rods 20 and 21 until the support spindle 53 appears to be aligned with the wheel hub 99 as shown in FIG. 2. The wheel aligning device may then be mounted on the support spindle in the conventional manner.

When the wheel rim does not have a peripheral lip, or the wheel rim is of a decorative type whose appearance would be damaged by the mounting methods just described, the present invention offers a third alternative mounting method. The user removes two opposite or nearly opposite wheel lug nuts 94 from the wheel rim 12a (FIGS. 6 and 7). In place of these lug nuts, spacers 69 (FIG. 8) are threaded onto the lug bolts 95 as shown in FIG. 7. The threaded ends 97 of the spacers 69 are approximately five inches above the surface of the wheel rim 12a and provide clearance so that the center sliding bracket 24 may be mounted directly above the wheel hub 99. Slot 63 is placed over the threaded end 97 of a first spacer. A second spacer is then inserted into one of the three remaining slots depending on the lug bolt pattern found on the wheel being aligned. When the lug bolt pattern contains an even number of lug bolts, the second spacer will be opposite the first and inserted into slot 65 which is opposite slot 63. When the wheel has five lug bolts, no two lug bolts will be opposite one another and the second spacer must be inserted into either slot 64 or slot 66, depending upon which lug nut has been removed. Once these spacers are inserted into the appropriate slots, their positions within the slots must be adjusted to align the support spindle 53 with the axis of the wheel hub 99. After this is done, the center sliding bracket 24 is firmly attached to the spacers using the lug nuts 94 which were removed from the wheel, as shown in FIGS. 6 and 7.

The procedure described in the foregoing paragraph is reversed when a wheel drum (not shown) is adapted to receive lug bolts, rather than having the bolts projecting from the wheel drum. In that event, the threaded end 97 of the spacer 69 is inserted in the wheel drum in place of the lug bolt. The center bracket 24 is aligned with the female ends 98 of the spacers and is attached using the lug bolts which had been removed. This method of attachment is not illustrated.

From the foregoing, it is evident that any of the three mounting methods just described can be used to position a support spindle 53 for a wheel aligning device perpendicular to the plane of the wheel rim and aligned with the wheel hub. The mounting and use of the wheel aligning device on the support spindle is conventional and will not be described herein.

Although the best mode contemplated for carrying out the present invention has been herein shown and described, it will be apparent that modification and variation may be made without departing from that which is regarded to be the subject matter of the invention.

What is claimed is:

1. A wheel clamp for supporting a wheel aligning tool in a plane parallel to the plane of a wheel rim, comprising
   a frame;
   a lower bracket attached to one end of the frame;
   means mounted on the lower bracket for engaging a peripheral lip extending outward from the wheel rim by which the one end of the frame is removably attached to the wheel rim;
   an upper bracket slidably mounted on the other end of the frame, the distance between the upper and lower brackets being adjustable to correspond to the diameter of the wheel rim;
   means mounted on the upper bracket for engaging the peripheral lip on the wheel rim by which the other end of the frame is removably attached to the wheel rim;
   means mounted on the upper bracket for selectively urging the upper bracket toward or away from the lower bracket;
   a center bracket slidably mounted on the frame between the upper bracket and the lower bracket, having two or more slots therein located and sized to correspond to lug bolt patterns commonly found on automobile wheels,
   a spindle projecting from the center bracket in a direction perpendicular to the plane of the wheel rim and adapted to support the wheel aligning tool,
   two or more spacers, each adapted to engage a vehicle wheel at one end and to be received within one slot located on the center bracket and affixed thereto at the opposite end, whereby the frame may be attached to the wheel rim in a parallel manner.

2. A wheel clamp as in claim 1, wherein the means mounted on the lower bracket for engaging the peripheral lip is one or more toothed members projecting rearward from the frame and adapted to adhere to the peripheral lip of the wheel rim.

3. A wheel clamp as in claim 2, wherein the toothed members are pivotally attached to the lower bracket.

4. A wheel clamp as in claim 1, wherein the means mounted on the upper bracket for engaging the peripheral lip is one or more toothed members adapted to adhere to the peripheral lip of the wheel rim.

5. A wheel clamp as in claim 4, wherein the toothed members are pivotally attached to the upper bracket.

6. A wheel clamp as in claim 1, wherein the frame comprises two parallel rods having lower ends attached to the lower bracket, said upper bracket having a pair of holes therein and said rods being received in the holes in the upper bracket to form a slidable mounting thereon.

7. A wheel clamp as in claim 6, wherein the means for selectively urging the upper bracket comprises
   a pair of latch plates disposed within the upper bracket, each having a hole adapted to receive one of the parallel rods;
   coiled springs disposed above and below each latch plate and adapted to maintain said latch plate generally perpendicular to the associated parallel rod;
   a clamping member operatively engaged with both the upper bracket and the latch plates, said clamping member including means for effecting the shifting of the position of the clamping member relative to the upper bracket to deflect the latch plates sufficiently so that the perimeter of the holes therein are canted against the associated parallel rod whereby the latch plates are secured to the parallel rods and so that the upper bracket is slid upward or downward in relation to the secured latch plates depending on the direction which the clamping member is moved.

8. A wheel clamp for supporting a wheel aligning tool in a plane parallel to the plane of the wheel rim, said wheel rim being mounted on a wheel drum having either a plurality of lug bolts projecting therefrom or a plurality of threaded holes adapted to receive lug bolts, said wheel clamp comprising
   a substantially flat plate having two or more slots therein, said slots located and sized to correspond to lug bolt patterns commonly found on vehicle wheels;
   a spindle projecting outward from a point at the center of the slots, said spindle adapted to support the wheel aligning tool in a plane parallel to the plane of the flat plate, two or more spacers, each comprising an elongate body having male thread at one end and female thread at the other end, said spacers each adapted to engage the vehicle wheel drum and to be received within one slot and affixed to the substantially flat plate.

9. In a wheel clamp for supporting a wheel aligning tool in a plane parallel to the plane of a wheel rim, said rim having a peripheral lip extending therefrom, said wheel clamp having a frame, a lower bracket mounted at one end of said frame, one or more toothed members projecting rearward from the lower bracket and adapted to engage the peripheral lip on the wheel rim, an upper bracket slidably mounted on the frame, the position of said upper bracket being adjustable to correspond to wheel rims of different diameter, one or more toothed members projecting rearward from the upper bracket and adapted to engage either the interior or exterior surface of the peripheral lip on the wheel rim, a center bracket slidably mounted on the frame and located between the upper and lower brackets, a spindle projecting forward from the center bracket and adapted to support the wheel aligning tool, an improved clamping mechanism for fixing the upper bracket to the frame and for selectively urging the toothed members against either the interior surface or exterior surface of the peripheral lip, comprising a pair of latch plates disposed within the upper bracket, each having a hole adapted to receive one of the parallel rods;

springs disposed above and below each latch plate and adapted to maintain said latch plate generally perpendicular to the associated parallel rod;

a clamping member operatively engaged with both the upper bracket and the latch plates, said clamping member including means for effecting the shifting of the position of the clamping member relative to the upper bracket to deflect the latch plates sufficiently so that the perimeter of the holes therein are canted against the associated parallel rods whereby the latch plates are secured to the parallel rods and so that the upper bracket is slid upward or downward in relation to the secured latch plates depending on the direction which the clamping member is moved.

10. In a wheel clamp according to claim 9 wherein said clamping member is threaded to said upper bracket and has a flexible abutting connection with said latch plates.

11. In a wheel clamp according to claim 10 wherein said clamping member comprises a knob having a projecting shaft thereon, said threaded connection of the clamping member with the upper bracket being provided on said shaft, and said shaft including a pair of opposed abutment surfaces for engaging said latch plates.

12. In a wheel clamp according to claim 9 wherein said springs comprise coil springs received upon said parallel rods.

* * * * *